United States Patent [19]
Rau et al.

[11] Patent Number: 5,390,222
[45] Date of Patent: Feb. 14, 1995

[54] FUEL ASSEMBLY OR CONTROL ASSEMBLY WITH RELEASABLE LOCKING BETWEEN THE CASE AND THE UPPER OR LOWER END PART OF THE ASSEMBLY

[75] Inventors: Peter Rau, Leutenbach; Walter Sauermann, Hemhofen, both of Germany

[73] Assignee: Siemens Aktiengesellschaft, Munich, Germany

[21] Appl. No.: 72,586

[22] Filed: Jun. 4, 1993

[30] Foreign Application Priority Data

Dec. 5, 1990 [DE] Germany .............................. 4028748
Dec. 21, 1990 [DE] Germany .............................. 4041350

[51] Int. Cl.$^6$ .............................................. G21C 15/00
[52] U.S. Cl. ..................................... 376/364; 376/446
[58] Field of Search ............... 376/364, 327, 178, 353, 376/446, 449, 352; 976/DIG. 65

[56] References Cited

U.S. PATENT DOCUMENTS

| | | | |
|---|---|---|---|
| 3,169,097 | 2/1965 | Meyers | 376/243 |
| 3,598,700 | 8/1971 | Lambert | 376/364 |
| 3,660,232 | 5/1972 | Banks | 376/459 |
| 3,741,868 | 6/1973 | Qurnell | 376/446 |
| 4,452,755 | 6/1984 | Hylton | 376/364 |
| 4,543,233 | 9/1985 | Grover et al. | 376/446 |
| 4,568,111 | 2/1986 | Christiansen et al. | 285/92 |
| 4,614,636 | 9/1986 | Walters | 376/451 |

FOREIGN PATENT DOCUMENTS 0383662  8/1990  European Pat. Off. .
2551248  3/1985  France .
1025939  4/1966  United Kingdom .

Primary Examiner—Donald P. Walsh
Assistant Examiner—Meena Chelliah
Attorney, Agent, or Firm—Herbert L. Lerner; Laurence A. Greenberg

[57] ABSTRACT

An fuel or control assembly for a nuclear reactor includes an elongated case having a longitudinal axis, side walls extending parallel to the axis and defining an interior with a polygonal cross section, two ends, a rim, and at least one case opening being surrounded by the rim at one of the ends. The side walls have inner surfaces with a groove-like profile being machined therein and extending at a predetermined distance from the rim. A bundle of rods parallel to the axis or an elongated absorber body is disposed in the interior of the case. An end part has lateral surfaces extending parallel to the axis and being adapted to the polygonal cross section of the interior. The end part has corners disposed between the lateral surfaces being rounded and shaped in the axial direction to form dovetail-like protrusions. The end part is rotatable into a first position relative to the case in which the end part is insertable axially from outside into the opening in the case during installation and in which the end part is axially displaceable outwardly during disassembly. The end part is rotatable into a second position relative to the case for operation of the nuclear reactor. The lateral surfaces of the end part are opposite the side walls of the case in the first position, and the dovetail-like protrusions engage the groove-like profile and are locked to the side walls of the case as soon as the end part is rotated about the axis into the second position.

18 Claims, 13 Drawing Sheets

FUEL ASSEMBLY OR CONTROL ASSEMBLY WITH RELEASABLE LOCKING BETWEEN THE CASE AND THE UPPER OR LOWER END PART OF THE ASSEMBLY

CROSS-REFERENCE TO RELATED APPLICATION

This application is a Continuation of International Application Ser. No. PCT/DE91/00230, filed Mar. 18, 1991.

SPECIFICATION

The invention relates to a fuel assembly or control assembly for a nuclear reactor with an elongated case, including an interior having a polygonal cross section and being defined by side walls that extend parallel to a longitudinal axis. The case is open on at least one end, for instance the upper end. A bundle or cluster of rods that is parallel to the axis or an elongated absorber body is inserted into the interior. In order to erect the assembly, an end part is introduced axially from outside into the case and its lateral surfaces, which extend parallel to the axis, are adapted to the polygonal cross section of the case interior or chamber.

In reactors in which the operating medium experiences a high temperature difference between the inlet and the outlet, the rod bundle or cluster requires structures for guiding the flow of operating medium. Such reactors include breeder reactors, for instance, or some gas-cooled reactors. Boiling water reactors and some pressurized water reactors of Soviet construction also have such structures for channeling the flow.

Such flow channels may be a permanent component of the reactor fixtures that cannot be dismantled or replaced. Conversely, if they are firmly or detachably connected to the rod bundle or cluster, then they are generally called a "fuel assembly case". They connect a lower and an upper support structure for the fuel assemblies (called the "fuel assembly head" and "fuel assembly foot"). It may be necessary then, through the use of structural provisions, to make up a skeleton from the case, head and foot of a fuel assembly in order to support the fuel rods. However, often the fuel assemblies are so close together in the reactor core that there are no gaps in their structure that could be used for installation elements and tools for installing or removing the fuel assembly.

If the fuel assembly case and the upper part of the fuel assembly are formed of materials of the same type, then sometimes these parts are welded to one another. A form-locking connection by means of pins or screws engaging at right angles to the fuel assembly axis necessitates taking special precautions to secure these small parts against being lost. A form-locking connection is one which connects two elements together due to the shape of the elements themselves, as opposed to a force-locking connection, which locks the elements together by force external to the elements. Such connections must moreover be capable of withstanding considerable forces, so that a secure connection requires more than one such locking element. However, that makes production complicated and expensive. Screws and pins that engage radially, and in particularly weld seams, also make access to the fuel rods more difficult, and sometimes access is possible only by destroying something. Inspections and repairs of such fuel rods have therefore previously been practically impossible to achieve, or in any case were not performed. Reference may be made, for instance, to the article "Fuel Element Design for the 300 MW(e)GCFR" by A. R. Veca et al, in Nuclear Engineering and Design, Vol. 40 (1977) No. 1, January 1977.

Some reactors, especially of a Soviet-type structure, are controlled by absorber assemblies that have the same outside dimensions as the fuel assemblies and likewise have an elongated case that is closed at the top and bottom with end parts and in which an elongated absorber body is disposed. In order to control the reactor, several such absorber assemblies are provided in place of fuel assemblies and are axially driven into and out of the hot zone of the reactor. They may be axially attached to a fuel assembly through a plug-type connection and may be joined together in the middle of the cases through a central control bar, producing a structure of double length, all of which is moved axially into the hot zone.

If the absorber bodies are to be changed in such control assemblies, or if the cases, end parts and other components are to be reused, then once again easy access to the case interior, in which at least one end part is detached from the case, is necessary. Heretofore, that has not been possible.

It is accordingly an object of the invention to provide a fuel assembly or a control assembly with releasable locking between the case and the upper or lower end part of the assembly, which overcomes the hereinafore-mentioned disadvantages of the heretofore-known devices of this general type and which does so at the least possible expense.

The invention is attained by a type of "bayonet mount" for an assembly of the type described at the outset, in which the end part has lateral protrusions, is thrust axially into the case interior and is then rotated in its entirety about its longitudinal axis until the protrusions engage a corresponding groove-like profile that is machined into the inner surfaces of the case side walls and bring about a form-locking connection.

With the foregoing and other objects in view there is provided, in accordance with the invention, an assembly for a nuclear reactor, comprising an elongated case having a longitudinal axis, side walls extending parallel to the longitudinal axis and defining an interior with a polygonal cross section, two ends, a rim, at least one case opening, preferably at the top, being surrounded by the rim at one of the ends, and upper edges of the lateral surfaces forming the rim surrounding the case opening, but alternatively or additionally the lower end also having such an opening; the side walls having inner surfaces with a groove-like profile being machined therein and extending at a predetermined distance from the rim; a bundle of rods being parallel to the longitudinal axis, or an elongated absorber body, being disposed in the interior of the case; an end part having lateral surfaces extending parallel to the longitudinal axis and being adapted to the polygonal cross section of the interior or chamber of the case, the end part having corners disposed between the lateral surfaces being rounded and shaped in the axial direction to form dovetail-like protrusions; the end part being rotatable into a first position relative to the case in which the end part is insertable axially from outside into the at least one opening in the case during installation and in which the end part is axially displaceable outwardly during disassembly, and the end part being rotatable into a second position relative to the case, being equivalent to the normal position during reactor operation; the lateral surfaces of the end part being practically directly opposite the side walls of the case in the first relative position, and the dovetail-like protrusions engaging the groove-like profile and being form-lockingly connected to the side walls of the case as soon as the end part is rotated about the longitudinal axis into the second relative position.

In accordance with another feature of the invention, the groove-like profile forms at least one receiving channel for the protrusions, and the at least one channel extends about the longitudinal axis in a substantially vertical plane.

In accordance with a further feature of the invention, the groove-like profile forms at least one receiving channel for the protrusions, and the at least one channel extends helically about the longitudinal axis at a predetermined inclination with respect to the longitudinal axis.

In accordance with an added feature of the invention, the case and the at least one opening formed in the case have regular polygonal cross sections with corners, each two of the corners and one of the protrusions of the end part together form interstices therebetween, and the groove-like profile forms curved partial channels each of which connect the interstices in the first relative position.

In accordance with an additional feature of the invention, the case has an exterior, the side walls have middles, and the partial channels in each of the side walls are open toward the exterior of the case in the middle of the side wall.

In accordance with yet another feature of the invention, the groove-like profile in each of the side walls has a plurality of partial channels being parallel to one another and disposed one below the other.

In accordance with yet a further feature of the invention, the rounded corners have a plurality of protrusions thereon being disposed one below the other and having an envelope with a barrel-like curvature.

In accordance with yet an added feature of the invention, the rim of the case is an upper rim, the end part has a lower rim, and the groove-like profile and the protrusions have a shape in the axial direction causing at least one of the rims to be inclined relative to the longitudinal axis.

In accordance with yet an added feature of the invention, the end part changes into a can seated on the case, and the can has an inner surface with a protrusion having a surface for engagement by a tool.

In accordance with again another feature of the invention, the end part has ends, and there is provided an axially displaceable locking element resting on one of the ends of the end part and engaging a recess machined into the one end of the end part in the second relative position.

In accordance with again a further feature of the invention, the rods have end pieces, and there is provided a retaining element at the at least one opening in the case, the end pieces being guided in the retaining element, a plate at the end of the case opposite the at least one opening, the retaining element being supported resiliently against the plate, and the locking element being secured to the retaining element.

In accordance with again an added feature of the invention, the locking element is a screw to be inserted into the recess and being retained in a thread formed on the end part.

In accordance with again a concomitant feature of the invention, the end part and the case or an insert disposed in the case each have at least one stop for preventing the end part from being rotated out of the first relative position past the second relative position.

Other features which are considered as characteristic for the invention are set forth in the appended claims.

Although the invention is illustrated and described herein as embodied in a fuel assembly or a control assembly with releasable locking between the case and the upper or lower end part of the assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention will be explained in detail below in conjunction with several drawing figures and exemplary embodiments. An assumption will be a frequent instance where a case is open at the top and a top part of an assembly forms an end part that is releasably connected to the case by means of a bayonet mount of the invention. In this instance, a lower end of the case is preferably also open, and a corresponding base plate is releasably inserted there. However, it is also possible for the lower end part of the fuel assembly to be provided with the bayonet mount.

Figure 1:
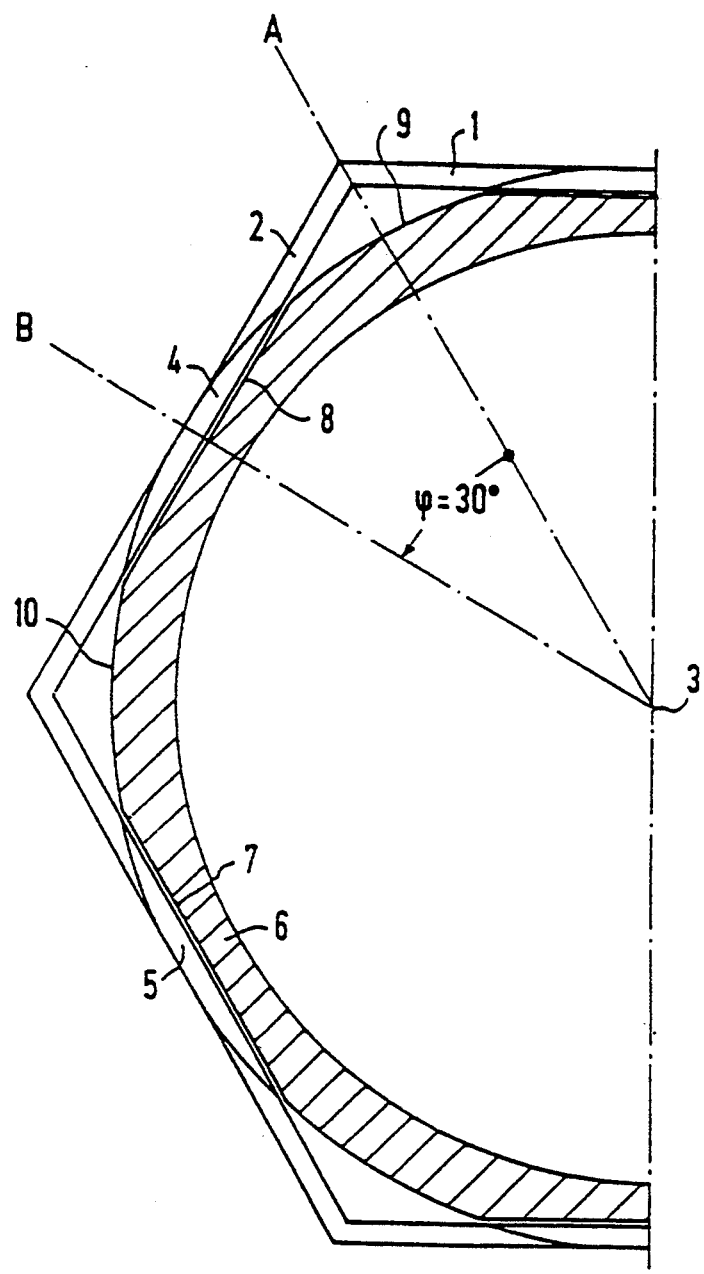
FIG. 1 is a fragmentary, diagrammatic, cross-sectional view of half of an upper part and a case in a first relative position.

Referring now to the figures of the drawing in detail and first, particularly, to FIG. 1 thereof, there is seen a polygonal case or box. Such cases generally have a cross section in the form of a regular polygon or n-gon, and a regular hexagon has been taken as an example.

Side walls, which are identified by reference numerals 1 and 2, for instance, have a groove-like profile, which extends in a plane that is practically vertical to the fuel assembly axis 3. This groove-like profile is produced, for example, by clamping the case and machining a groove into an inner wall surface of the case using a lathe chisel. If this lathe chisel or other tool is moved along a helical line, then grooves in the form of a single-start or multiple-start thread may also be created, which extend helically around the fuel assembly axis at a predetermined angle of inclination relative to the fuel assembly axis.

Reference letter A indicates a diagonal which serves as a reference axis between two opposed corners of the regular n-gon. The groove-like profile then forms receiving channels 4, 5, which extend in the side walls of the case only in the vicinity of the axial center line of the lateral surfaces. An upper part or end part 6 of the fuel assembly, in the sectional plane shown in FIG. 1, has a bead, which may be produced in annular form, for instance, but in which lateral surfaces 7, 8 have been ground that are opposite the side walls of the case which carry the receiving channels 4, 5. The axial center line of a lateral surface is accordingly defined by the intersection of an axis B with the lateral surface 8, which represents a reference axis assigned to the upper part.

This likewise creates a cross section in the form of a regular n-gon, but having corners 9, 10 which are located between two lateral surfaces, are rounded and form protrusions. In the axial direction, the protrusions are adapted to the profile of the receiving channels 4, 5 in such a way that if there is a rotation of the upper part of the n-gon by 360°/2n, or in other words if there is an angle of 30° between the axes A and B, these corners or protrusions 9, 10 are rotated into the corresponding receiving channels, where they form a form-locking connection between the case walls 1, 2 and the upper part 6.

Figure 2:
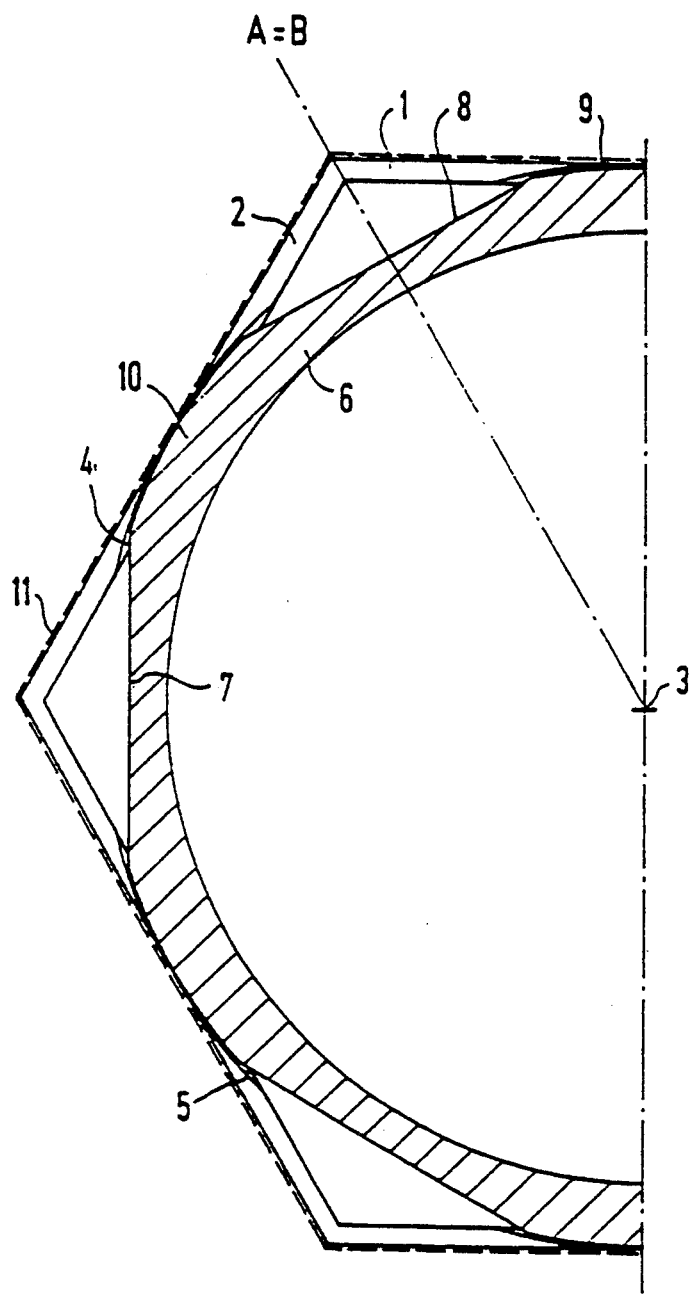
FIG. 2 is a view similar to FIG. 1 of the same cross section in a second relative position, in each case with an assembly in the form of a regular hexagon.

FIG. 1 shows the upper part 6 in a first relative position, which is defined by the angle between the axes A and B and in which the upper part can be inserted axially into the case from above for installation or can be removed from it upwardly for disassembly. FIG. 2 shows the same fuel assembly in the position intended for long-term reactor operation, in which by the aforementioned rotation the axes A and B are made to coincide.

A broken line 11 represents the outer contour of the largest case that is still allowable based on permitted tolerances. The cutting depth of the aforementioned lathe chisel, which defines the largest opening cross section of the receiving channels formed by the groove-like profile, is therefore selected in such a way that it is as large as or only slightly larger than the circle inscribed inside the polygon represented by the line 11. This circle then in practical terms also defines the maximum lateral projection of the bead with respect to the fuel assembly axis 3.

This creates receiving channels in each side wall of the case, which not only join together interstices between the corners of the side walls 1 and 2 and the upper part 6 but also lead from these interstices to outer surfaces of the side walls, in the form of curved partial channels.

Figure 3:
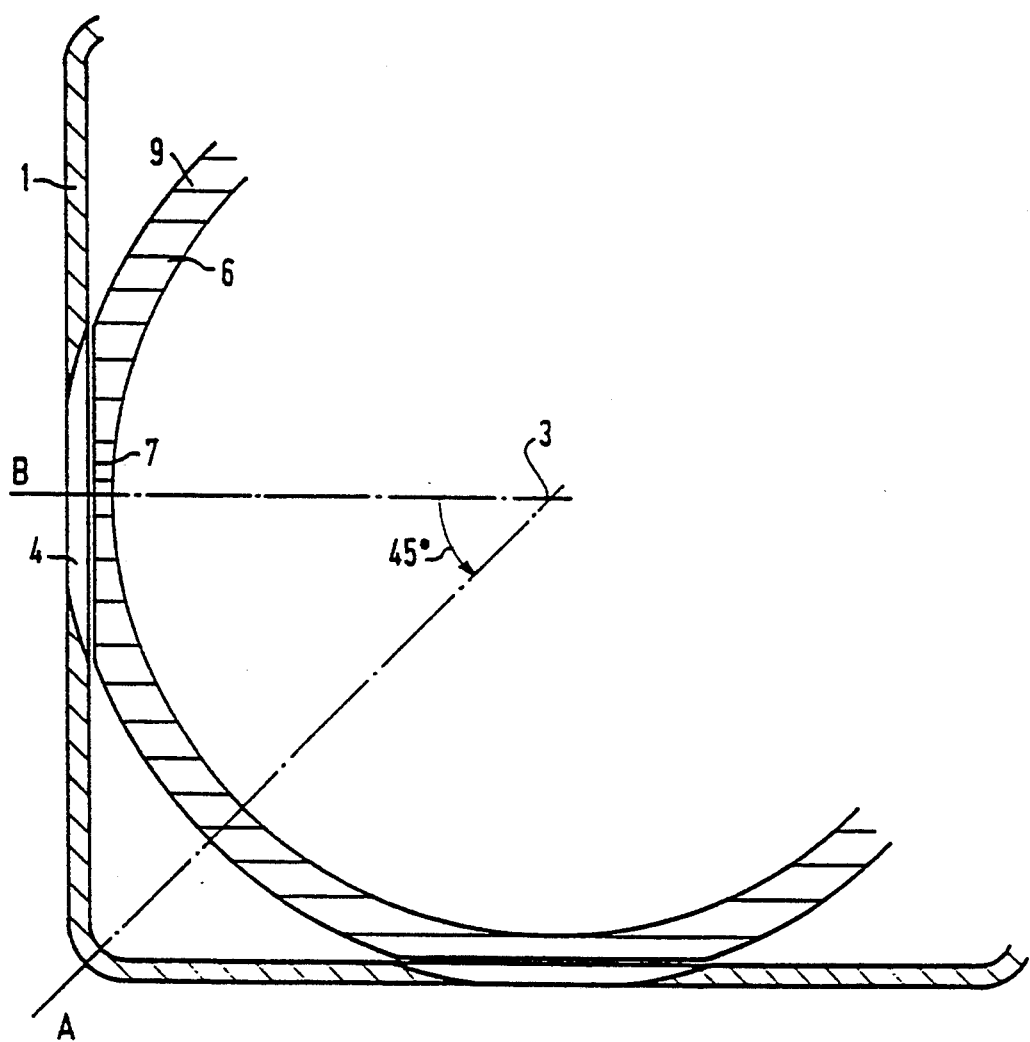
FIGS. 3 and 4 are views similar to FIGS. 1 and 2 of corresponding cross sections for an assembly with a square cross section.

Taking a rectangular case having a side wall 1 as an example with its corresponding receiving channels 4, FIG. 3 then shows how the upper part 6 with the lateral surfaces 7 and the corners 9 rounded off and acting as protrusions is constructed so that the upper part is axially movable in the case in the installation position. This installation position is defined by the first relative position, in which the diagonal A serving as the reference axis of the case and the corresponding reference axis B of the upper part, which leads from the fuel assembly axis 3 to the middle of the lateral surface 7, forms an angle of $360°/2n = 45°$.

Figure 4:
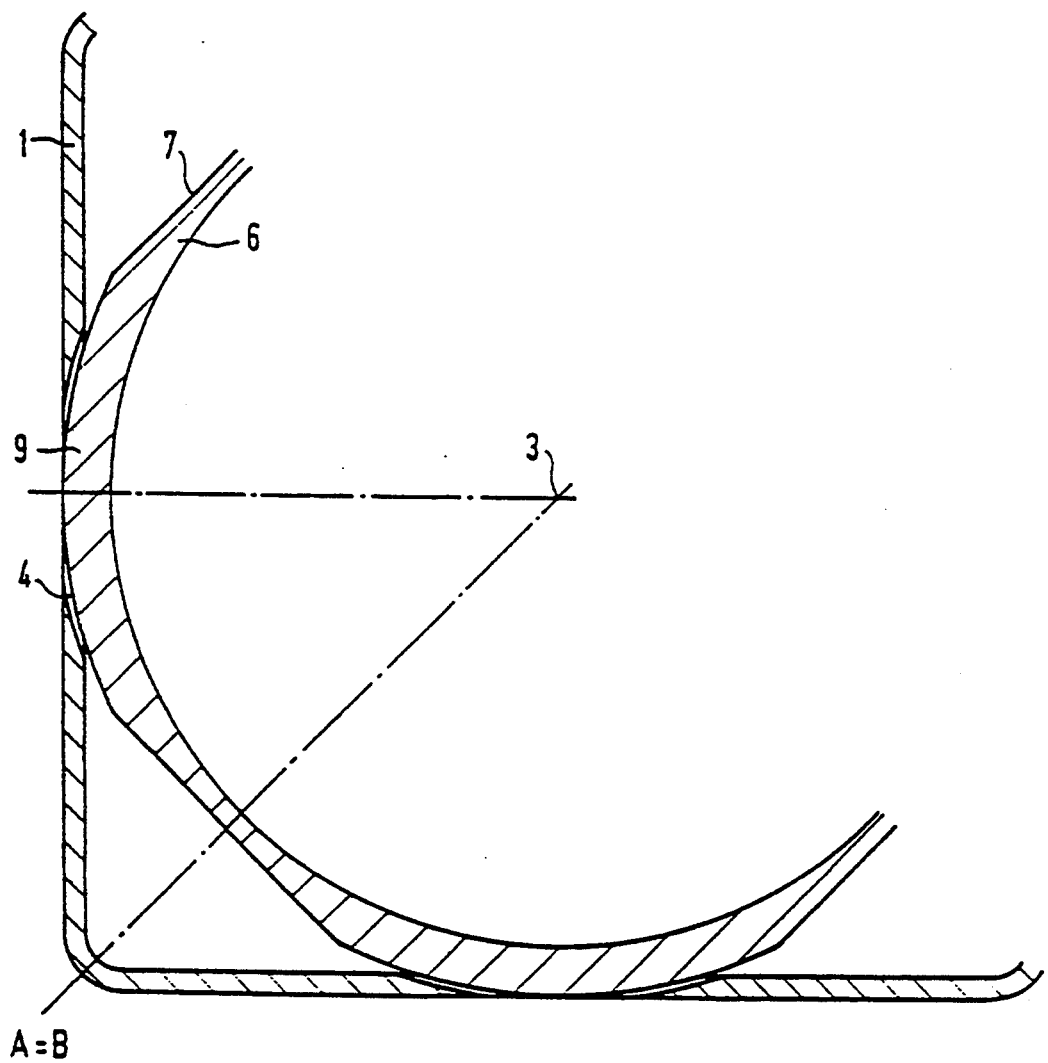

The component is put in a position shown in FIG. 4, in which the protrusions 9 form-lockingly engage the receiving channels 4, by rotation about this angle of 45°.

Figure 5:
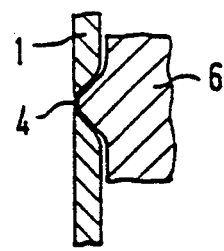
FIGS. 5, 6, 7 and 8 are fragmentary, longitudinal-sectional views showing various shapes of protrusion-like and groove-like profiles.
Figure 6:
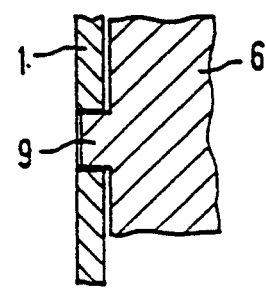
Figure 7:
Figure 8:

FIG. 5 shows a longitudinal section through the upper part 6 and the case having the side wall 1, in which the axial profile of the receiving channels 4 becomes clear. This axial profile may be square, in accordance with FIG. 6. However, an especially tilt-proof form-locking connection is produced if the protrusions as seen in an axial longitudinal section have an upper rim as seen in FIG. 7 which is inclined relative to the fuel assembly axis or a lower inclined rim. The form of a dovetail shown in FIG. 8 with inclined upper and lower rims is preferred.

Figure 9:
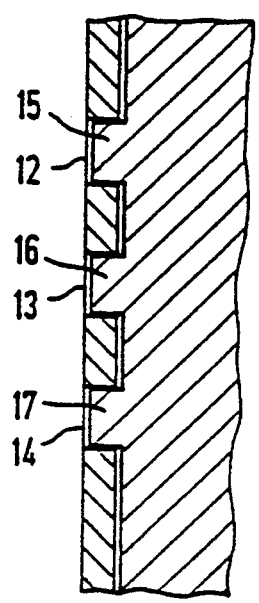
FIGS. 9 and 10 are views similar to FIGS. 5-8 of longitudinal sections of a bayonet mount with a plurality of receiving channels located one above the other, for a plurality of protrusions located one above the other.
Figure 10:
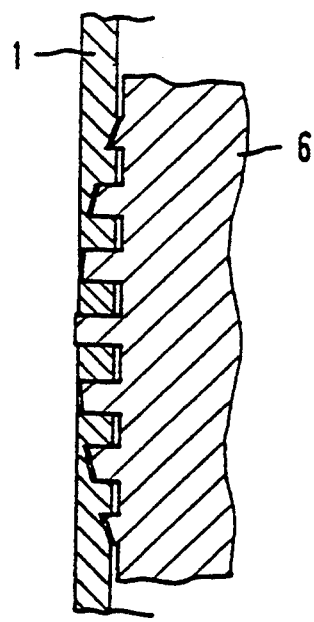

As FIG. 9 shows, a plurality of receiving channels 12, 13, 14 for corresponding protrusions 15, 16 and 17 that are located one above the other may be provided in each side wall. An especially stable connection is obtained if the aforementioned bead of the upper part into which the lateral surfaces are machined, is arched in barrel-like fashion and the protrusions are formed by suitable notching of this bead. The envelope of these protrusions then is a spherical or a barrel-like surface, as FIG. 10 shows.

Figure 11:
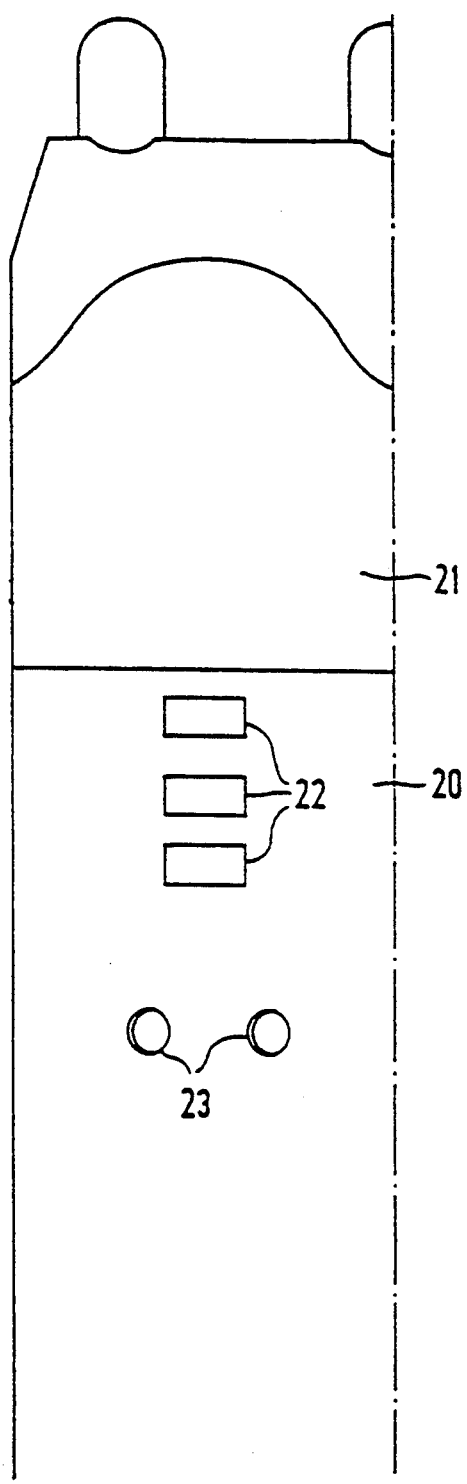
FIGS. 11 and 12 are fragmentary, longitudinal-sectional views of an upper region of half of a fuel assembly case with further components thereof.

FIG. 11 is an outside view of a side wall 20 of the case, beyond which an end piece 21 of the upper part protrudes. Windows 22 that lead outward and can be seen in the side wall 20, are created by means of the groove-like profile in the inner surface of the side walls. Openings 23 make it possible in an emergency to use the operating medium for cooling rods in the case interior as well. Otherwise, the operating medium is located in an interstices between the fuel assemblies.

The upper end piece 21 has outer surfaces that at first are flush with the case wall 20, but then it changes into an annular collar, having an upper edge which has a suitable profile for manipulating and positioning the fuel assembly.

Figure 12:
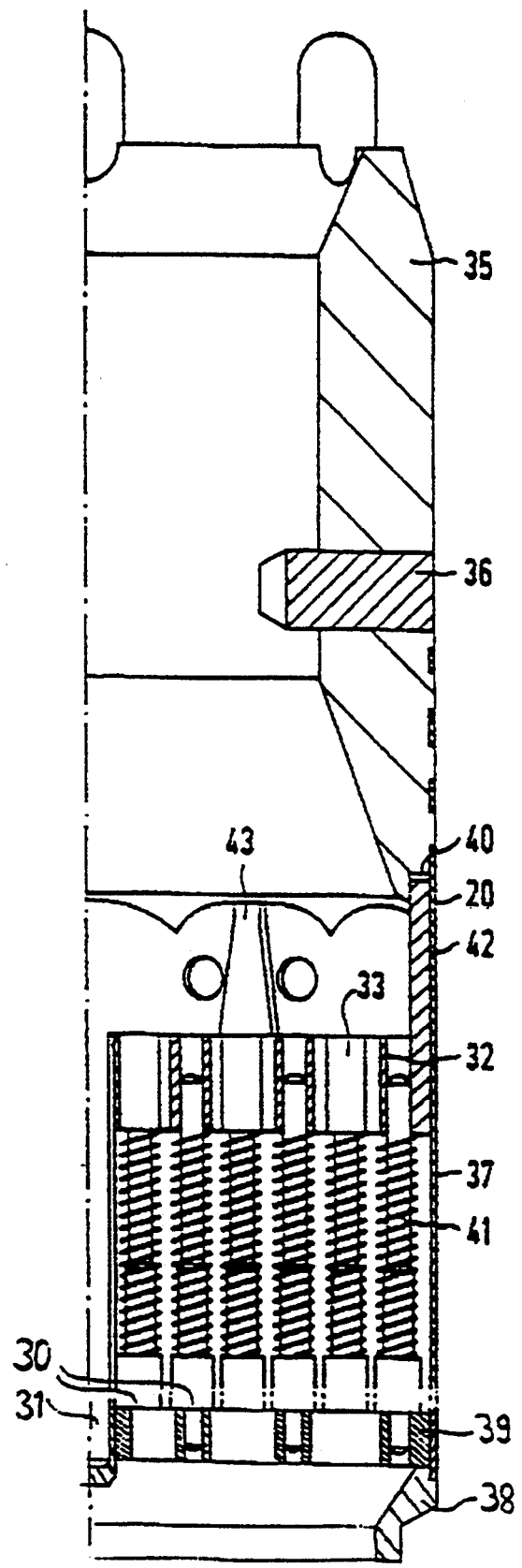

FIG. 12 is a corresponding inside view of the fuel assembly in the operating state. Upper end caps of rods 30 that are located next to and behind one another and are parallel to one another are shown. These rods are filled with radioactive material. A further rod 31, which is constructed as a guide tube or an instrumentation tube, can also be seen. These rods and end caps are guided in a rod holder grid 32 or they are secured in a similar way to one such retaining element, which has flow openings 33 for the operating medium.

The upper part takes the form of a can 35 and has protrusions 36 on its inner surface. These protrusions may be engaged by gripping and turning tools in order to insert the upper part into a case 20 from above in the first relative position (installation position) and then rotate it into the second relative position (operating position).

In order to secure this operating position against twisting, at least one recess 40 pointing axially upward is provided in the lower surface of the upper part 35. This recess may be engaged by a pin 42 or 43 or by a similar locking element that is resiliently supported under the upper part relative to the upper part, as soon as the upper part is put into the operating position. This locking element, as FIG. 12 shows, is secured to the top of the grid or retaining element 32, which is pressed against the lower surface of the upper part 35 by compression springs 41.

In order to install the fuel assembly, the rods are first inserted, for instance, and then the retaining element 32 is put in place and pressed downward counter to the compression springs. In the process, lower caps of the rods 30, 31, which stand on a lower retaining grid or similar foot plate 39 at the other end 38 of the fuel assembly, are pressed against the foot plate and the springs 41 are compressed even further, in order to enable the insertion and turning into position of the upper part. Upon relief of the springs, the pin 42 locks into the recess 40 in the operating position, and a torsionally secured, stable connection is established between the case 20 and the upper part.

For disassembly, first the retaining element 32 is pressed downward again, and the pin 42 clears the recess 40. As a result, the upper part 35 can be rotated outward and removed. This makes the retaining element, with the fuel rods located below it, accessible, and the entire bundle or cluster can be pulled out of the case 20, or individual fuel rods can be replaced.

Figure 13:
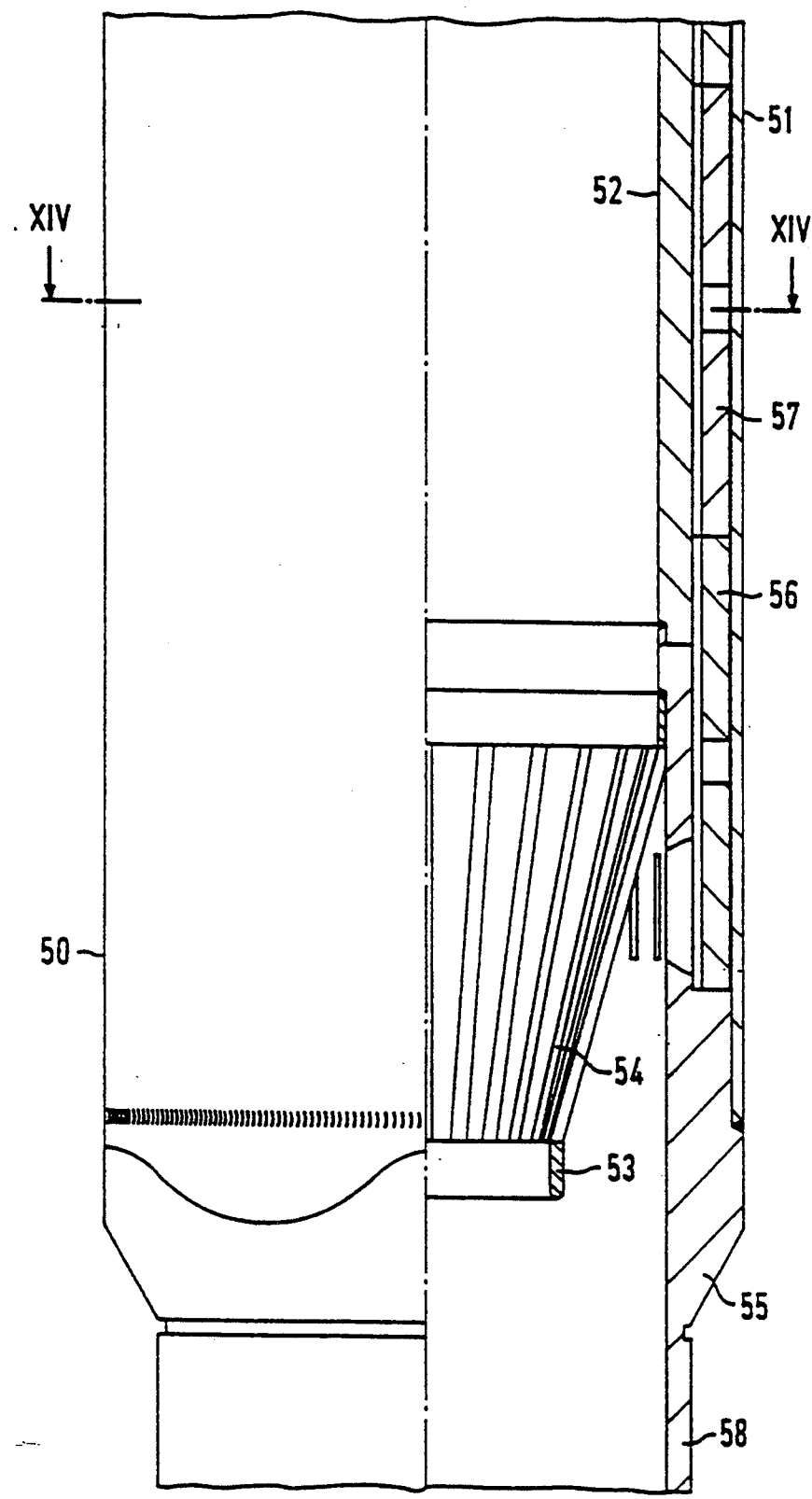
FIGS. 13 is a fragmentary, longitudinal-sectional view

The left half of FIG. 13 shows a lower part of a side wall 50 of a case 51 of a control assembly having a cross section which is shown in the right half of FIG. 13. The case 51 also has a cross section in the form of a regular hexagon.

The lower end of an inner can 52, which extends through the entire assembly, tapers conically at the end to form an inflow neck 53 with flow openings 54. This inflow neck may also be detachably connected to the case 51, advantageously by means of a bayonet mount according to the invention. In the present instance, the case 51 rests on protrusions of a lower end part 55 and can be welded to them.

Figure 14:
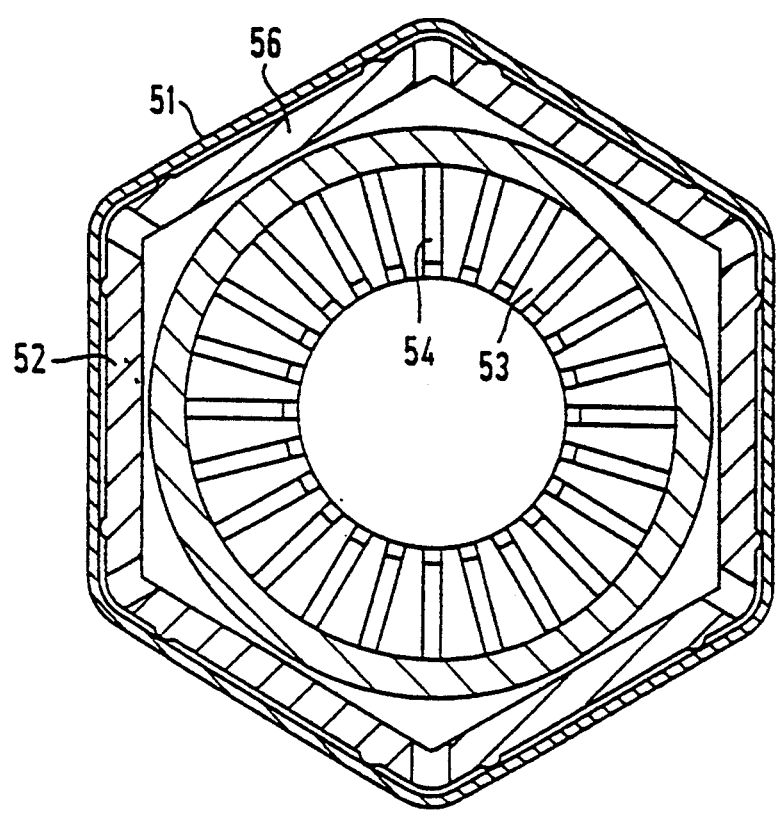
FIG. 14 is a cross-sectional view taken along a line XIV—XIV of FIG. 13, in the direction of the arrows, of a lower part of a control assembly.

A space between the inner can 52 and the case 51 carries an absorber body, which in this instance includes hexagonal rings 56, 57 made of boron steel. FIG. 14 shows a corresponding cross section in a plane XIV—XIV.

An absorber assembly may be slipped onto the upper end part of a fuel assembly by means of a collar 58 of the lower end part 55 of the absorber assembly. The inflow neck or cone 53 may then serve to guide a non-illustrated control bar, which extends from a cuff 60 shown in FIG. 15 in the upper end part of the control assembly, through the inner can 52 of the absorber assembly, the upper end part of the fuel assembly mounted thereon and the guide tube 31 shown in FIG. 12, down as far as the base plate at the lower end of the fuel assembly.

Figure 15:
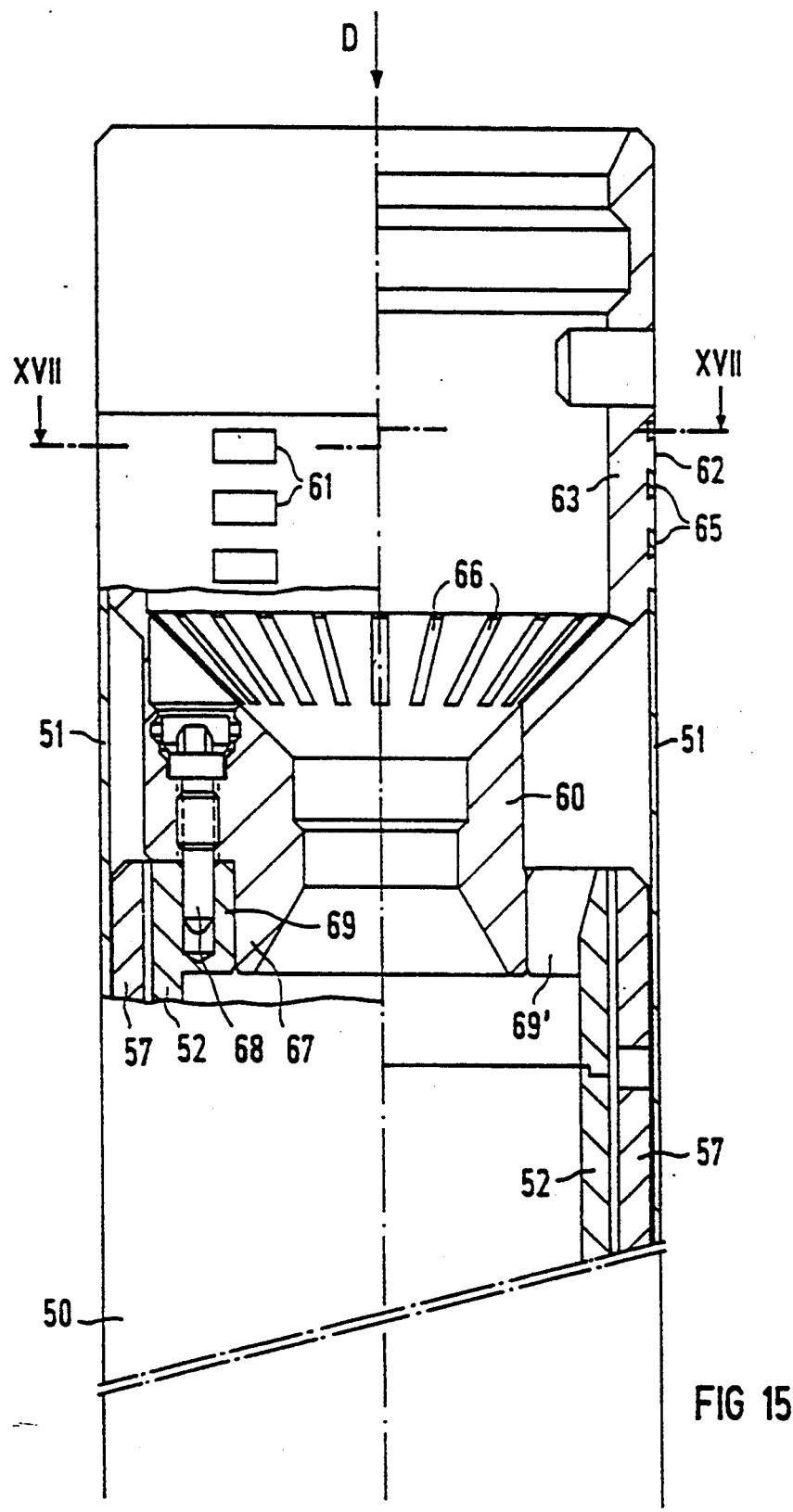
FIG. 15 is a partly broken-away, longitudinal-sectional view of an upper end part of a control assembly according to the invention.

The upper end of the side wall 50 can be seen in the left-hand part of FIG. 15. The right-hand part thereof shows a longitudinal section through the upper end of the control assembly. Partial channels 65 that are located one below the other can be seen there in the right-hand part of FIG. 15. The partial channels are machined as a profile-into the inner surface of the side wall of the case 51, creating windows 61 leading outward in the middle of the side wall. These channels are form-lockingly engaged by protrusions 62 at the corners of an upper end part 63 of the control assembly, as soon as the end part has been rotated into its position that is intended for reactor operation, as has already been explained in conjunction with FIGS. 1 and 2 for an end piece of a fuel assembly.

The cuff 60, into which the end part 63 comes to an end in the form of a cone provided with outlet openings 66, has a lateral extension 67 with a bore that is provided with an internal thread for retaining a screw 68. In the position intended for reactor operation, this screw comes to rest above a recess on a protrusion 69, into which the screw can be turned. Accordingly, the screw serves as an axially displaceable locking element, while the protrusion 69 is secured on the fuel assembly case, or as in the present instance on the inner can 52 inserted into the case 51.

The right side of FIG. 15 shows one further protrusion 69' of this kind, which also serves to center the cuff 60 and serves as a stop, against which a corresponding stop body (which is not visible in FIG. 15) comes to a stop on the end part as soon as the end piece has been turned into its second relative position, in which the screw or locking element 68 comes to rest above the recess in the protrusion 69'. The end piece, which was inserted into the case in the first relative position, accordingly cannot be twisted beyond the second relative position.

Figure 16:
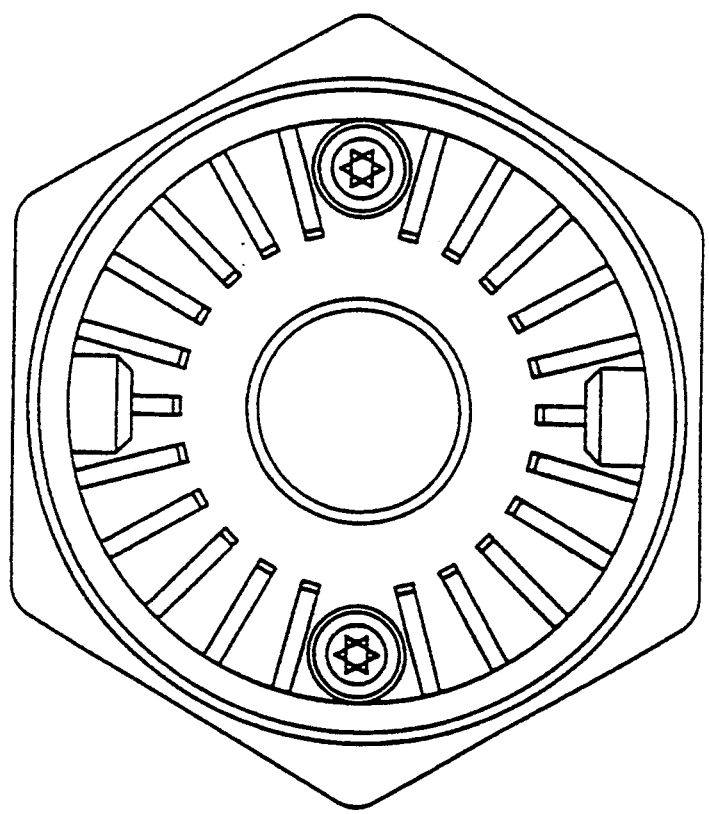
FIGS. 16 is a top-plan view and FIG. 17 is a cross-sectional view taken along a line XVII—XVII of FIG. 16, in the direction of the arrows, of an upper end part of the control assembly of FIG. 15.
Figure 17:
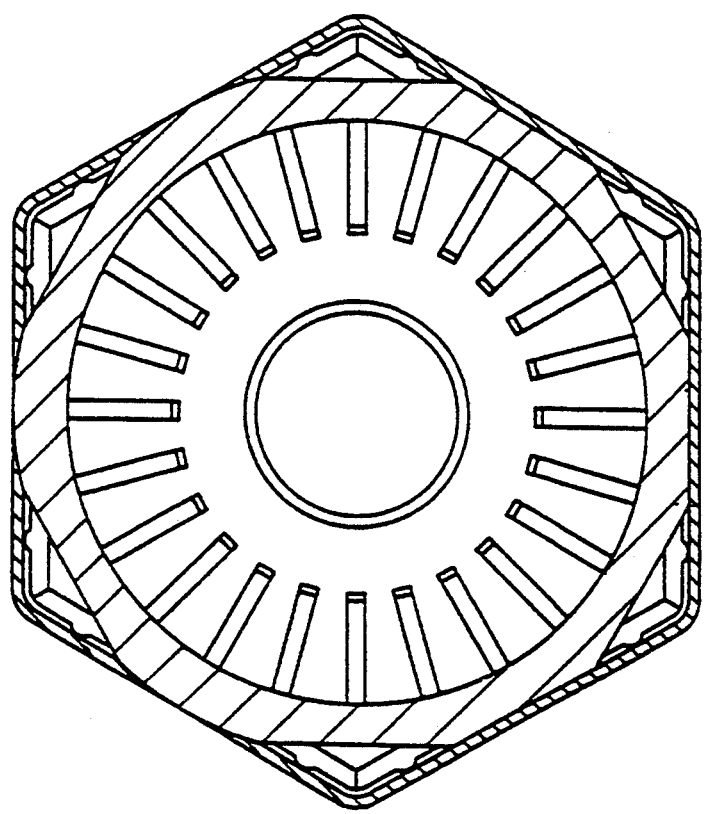

An arrow D in FIG. 15 indicates a viewing direction for the plan view shown in FIG. 16 on the upper end part of the control assembly in the second relative position of the end part and case, while the sectional plane XVII—XVII identifies the cross section shown in FIG. 17.

The control assembly can accordingly be easily opened at the top, by rotating its upper end part back into the first relative position with respect to the case and pulling it axially upward out of the case.

We claim:

1. An assembly for a nuclear reactor, comprising:
   a) an elongated case having a longitudinal axis, side walls extending parallel to the longitudinal axis and defining an interior with a polygonal cross section, two ends, and at least one case opening being surrounded by a rim at one of said ends; said interior defining a flow channel for coolant passing through said opening in an axial direction;
   b) said side walls having inner surfaces with a groove-like profile being machined therein and extending at a predetermined distance from said rim;
   c) an end part to be received in said opening of said case and having lateral surfaces extending parallel to the longitudinal axis, said end part being adapted to the polygonal cross section of said interior of said case and having corners disposed between said lateral surfaces being rounded and shaped in the axial direction to form dovetail-like protrusions;
   d) said end part being rotatable into a first position relative to said case in which said end part is insertable axially from outside into said opening in said case during installation and in which said end part is axially displaceable outwardly during disassembly, and said end part being rotatable into a second position relative to said case for operation of the nuclear reactor;
   e) said lateral surfaces of said end part being opposite said side walls of said case in said first relative position, and said dovetail-like protrusions engaging said groove-like profile and being locked to said side walls of said case when said end part is rotated about the longitudinal axis into said second relative position.

2. The assembly according to claim 1, including a bundle of rods in the interior of said case being parallel to the longitudinal axis, for a fuel assembly.

3. The assembly according to claim 1, including an elongated absorber body in the interior of said case, for a control assembly.

4. The assembly according to claim 1, wherein said groove-like profile forms at least one receiving channel for said protrusions, and said at least one channel extends about the longitudinal axis in a substantially vertical plane.

5. The assembly according to claim 1, wherein said groove-like profile forms at least one receiving channel for said protrusions, and said at least one channel extends helically about the longitudinal axis at a predetermined inclination with respect to the longitudinal axis.

6. The assembly according to claim 1, wherein said case and said at least one opening formed in said case have regular polygonal cross sections with corners, each two of said corners and one of said protrusions of said end part together form interstices therebetween, and said groove-like profile forms curved partial channels each of which connect the interstices in the first relative position.

7. The assembly according to claim 6, wherein said case has an exterior, said side walls have middles, and said partial channels in each of said side walls are open toward the exterior of said case in the middle of said side wall.

8. The assembly according to claim 6, wherein said groove-like profile in each of said side walls has a plurality of partial channels being parallel to one another and disposed one below the other.

9. The assembly according to claim 7, wherein said groove-like profile in each of said side walls has a plurality of partial channels being parallel to one another and disposed one below the other.

10. The assembly according to claim 8, wherein said rounded corners have a plurality of protrusions thereon being disposed one below the other and having an envelope with a barrel-like curvature.

11. The assembly according to claim 9, wherein said rounded corners have a plurality of protrusions thereon being disposed one below the other and having an envelope with a barrel-like curvature.

12. The assembly according to claim 1, wherein said rim of said case is an upper rim, said end part has a lower rim, and said groove-like profile and said protrusions have a shape in the axial direction causing at least one of said rims to be inclined relative to the longitudinal axis.

13. The assembly of one according to claim 1, wherein said end part changes into a can seated on said case, and said can has an inner surface with a protrusion having a surface for engagement by a tool.

14. The assembly according to claim 1, wherein said end part has ends, and including an axially displaceable locking element resting on one of said ends of said end part and engaging a recess machined into said one end of said end part in said second relative position.

15. The assembly according to claim 2, wherein said end part has ends, said rods have end pieces, and including an axially displaceable locking element resting on one of said ends of said end part and engaging a recess machined into said one end of said end part in said second relative position, a retaining element at said at least one opening in said case, said end pieces being guided in said retaining element, a plate at said end of said case opposite said at least one opening, said retaining element being supported resiliently against said plate, and said locking element being secured to said retaining element.

16. The assembly according to claim 14, wherein said locking element is a screw to be inserted into said recess and being retained in a thread formed on said end part.

17. The assembly according to claim 1, wherein said end part and said case each have at least one stop for preventing said end part from being rotated out of said first relative position past said second relative position.

18. The assembly according to claim 1, including an insert disposed in said case, said end part and said insert each having at least one stop for preventing said end part from being rotated out of said first relative position past said second relative position.

* * * * *

UNITED STATES PATENT AND TRADEMARK OFFICE
CERTIFICATE OF CORRECTION

PATENT NO. : 5,390,222

DATED : February 14, 1995

INVENTOR(S) : Peter Rau, Walter Sauermann

It is certified that error appears in the above-identified patent and that said Letters Patent is hereby corrected as shown below:

On the title page, item [30], change the priority No. "4028748" to read -- 4038748

Signed and Sealed this

Sixth Day of June, 1995

Attest:

BRUCE LEHMAN

*Attesting Officer*   *Commissioner of Patents and Trademarks*